April 22, 1930.  E. C. HERTHEL  1,755,600
ART OF CRACKING HYDROCARBONS
Filed June 30, 1925
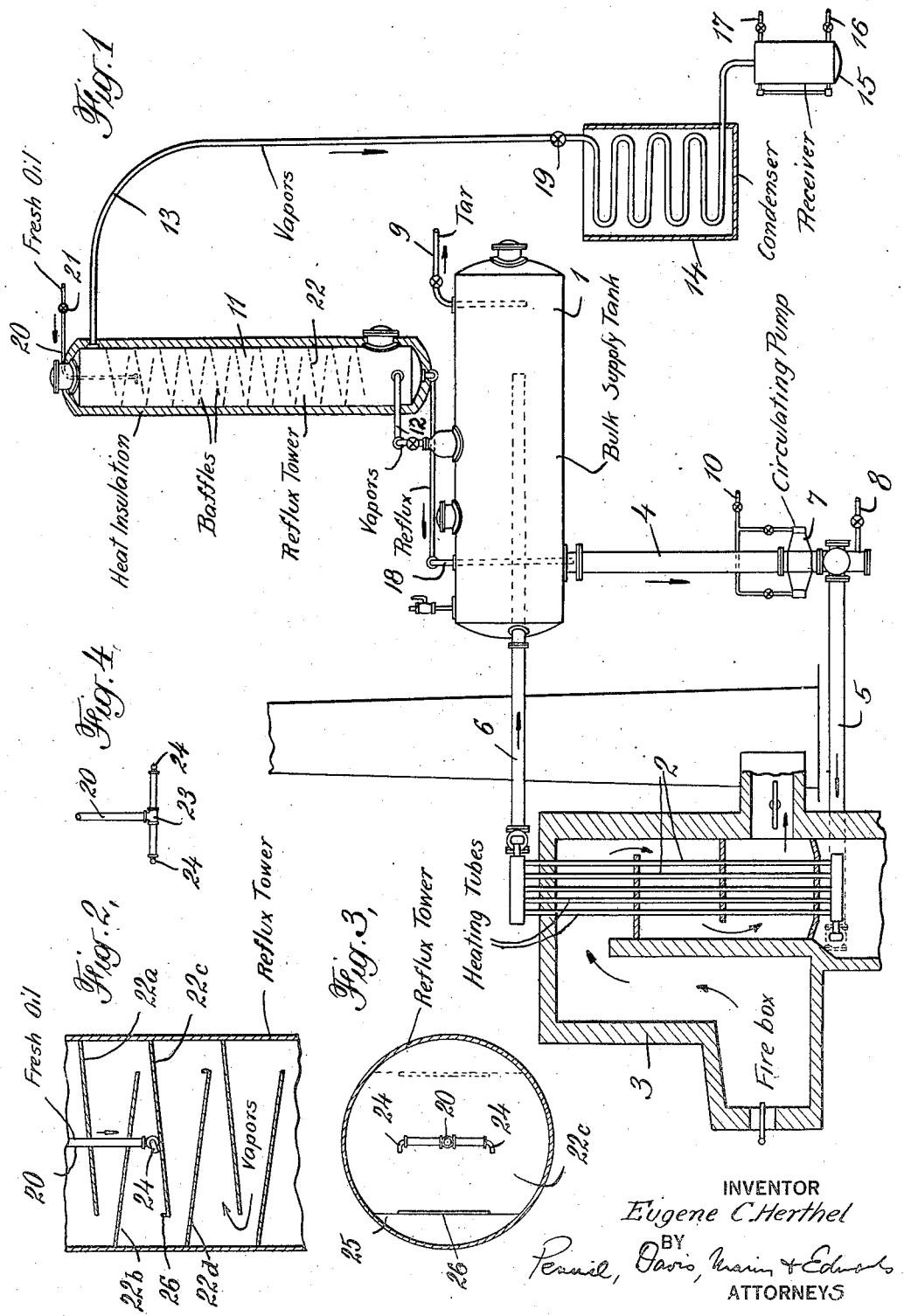
INVENTOR
Eugene C. Herthel
BY
Pennie, Davis, Marvin & Edmonds
ATTORNEYS Patented Apr. 22, 1930

1,755,600

UNITED STATES PATENT OFFICE

EUGENE C. HERTHEL, OF CHICAGO, ILLINOIS, ASSIGNOR TO SINCLAIR REFINING COMPANY, OF NEW YORK, N. Y., A CORPORATION OF MAINE

ART OF CRACKING HYDROCARBONS

Application filed June 30, 1925. Serial No. 40,502.

This invention relates to the cracking of heavier hydrocarbon oils, such as gas oil and the like, to produce lighter hydrocarbon oils, such as gasoline and pressure distillate, by distillation under pressure. More particularly, the invention relates to improvements in the operation and construction of reflux towers employed in conjunction with pressure stills for cracking hydrocarbon oils. This application is in part a continuation of a prior application filed November 28, 1921, Serial No. 518,447.

In the prior application above identified there is described an improved method of cracking hydrocarbon oils in which the vapors of the cracked oil escaping from a pressure still are passed through a reflux tower into which fresh oil to be supplied to the pressure still is introduced in direct contact with the vapors, the refluxing operation being promoted and controlled by the introduction of fresh oil and the unvaporized part of the fresh oil and the reflux admixed therewith being then supplied to the pressure still. This operation is advantageously carried out in a reflux tower insulated against heat loss and of simple baffle construction providing for free flow of vapors therethrough. By employing a heat insulated tower, improved control is provided and the heat economy of the entire operation is improved, the heat ordinarily lost in refluxing being absorbed in the fresh oil and returned to the pressure still therein. In connection with a pressure still, a simple baffle tower has several advantages. Free flow of vapors is provided and any danger due to sudden development of pressure in the still is avoided. The operation of such a tower is also much more susceptible to regulation than where towers containing large liquid bodies are used, and substantially immediate control of the operation can be had.

Where fresh oil is directly introduced into the reflux tower employed in such an operation, it has been customary to provide for distribution of the fresh oil in the tower by spraying it in at the upper end of the tower. As the vapors escape from the upper end of such towers as usually employed, such spraying of the fresh oil into the vapors adjacent the vapor outlet tends to cause entrainment of constituents of the fresh oil in the escaping vapors. This tendency can be inhibited by introducing the fresh oil part way down the tower, but it is not desirable to introduce the fresh oil any substantial distance below the upper end of the tower, particularly where a heat insulated tower is used, in such operations as this makes that part of the tower above the point of introduction more or less ineffective for the intended purpose. One object of this invention is to provide an improved method and apparatus enabling the direct introduction of fresh oil near the upper end of reflux towers employed in conjunction with pressure cracking stills, particularly heat insulated reflux towers, while avoiding or reducing difficulties due to entrainment of constituents of the fresh oil in vapors escaping from the upper end of such towers. Other and further objects will appear as the description proceeds.

According to this invention, a reflux tower of simple baffle construction is employed and the fresh oil is introduced near the upper end of the tower, vapors from the pressure still being passed upwardly through the tower, and the fresh oil is introduced so that initially it flows downwardly through the tower in one or more streams in heat exchanging relation with the vapors therein, both directly on the exposed surfaces of such streams and indirectly through the baffles over which it flows, which streams however are not distributed through the vapors as more or less finely divided drops or particles near the upper end of the tower. As the oil flows downwardly through the tower, the streams may be broken up and sprayed or distributed through the vapors in a more or less finely divided state, but such action is inhibited until the oil is part way down the tower, while at the same time heat transfer conditions are maintained which make the entire tower effective in carrying out the desired refluxing operation. The fresh oil may also be introduced one or two baffles below the top of the tower to further inhibit any tendency to entrainment.

The invention will be further described in connection with the accompanying drawings which illustrate an apparatus embodying the invention and adapted for operation in accordance with the invention but it is intended and will be understood that this further description and illustration are for the purpose of exemplification and that the invention is not limited thereto.

In the accompanying drawings:

Fig. 1, diagrammatically represents in elevation and partly in section a pressure still system including a reflux tower constructed and adapted for operation in accordance with this invention, Fig. 2, is an enlarged vertical section of part of the tower illustrated in Fig. 1, Fig. 3, is a similarly enlarged transverse section of the tower illustrated in Fig. 1, and Fig. 4 is in detail showing the connections for introducing oil illustrated in the preceding figures.

For the purpose of illustration a reflux tower constructed and adapted for operation in accordance with the invention is shown in connection with a pressure cracking still of the general type described and illustrated in Patent No. 1,285,200 granted to the Sinclair Refining Company, November 19, 1918, on the application of Edward W. Isom. It will be apparent, however, that the improvements of the invention may be employed in connection with pressure cracking stills of other and different types. The pressure still system illustrated comprises a bulk supply tank 1 and a battery of heating tubes 2 located in the heating flue of a furnace 3, and circulating connections 4, 5 and 6 including a circulating pump 7 arranged for circulating oil from the bulk supply tank 1 to the lower end of the heating tube 2 and thence upwardly therethrough back to the bulk supply tank through circulating connection 6. The oil is heated to a cracking temperature in the vertical heating tubes 2 and the heat input for effecting the cracking operation is effected therein. A connection 8 is provided for pumping out and initially charging the still with oil and a tar draw-off 9 is arranged for withdrawing tar while the still is in operation. Oil for cooling the bearings of the circulating pump is supplied through connection 10 and fresh oil may be supplied to the pressure still charge through this connection by being forced through the bearings of the pump. A reflux tower 11 is arranged above the bulk supply tank and the vapors escaping from the vapor dome on the bulk supply tank through connection 12 enter the lower end of the reflux tower and after passing upwardly therethrough escape from the upper end through connection 13 to the condenser 14. The condenser is arranged to discharge into a receiver 15 from which condensed distillate may be withdrawn through connection 16 and any uncondensed vapors and gases through connection 17. A connection 18 is provided for returning reflux, and admixed fresh oil, from the lower end of the reflux tower 11 to the upper end of the circulating connection 4. The pressure in the still system may be regulated either by a valve 19 in the vapor line between the reflux tower and the condenser or by suitable valves arranged beyond the condenser or the receiver.

A connection 20 is provided for the introduction of fresh oil into the upper end of the reflux tower 11. The reflux tower is advantageously lagged and the refluxing operation controlled by regulating the supply of fresh oil introduced into the upper end of the reflux tower for example by means of valve 21 in connection 20. The reflux tower is provided with a number of baffles 22 arranged between the upper and lower ends of the towers. As illustrated, these baffles provide for relatively free flow of vapors rising through the tower and do not retain any substantial bodies of liquid so that the equilibrium conditions within the tower are subject to ready and substantially immediate control. Inside of the tower, the connection 20 extends through the two uppermost baffles $22^a$ and $22^b$ (see Figure 2) and just above the third baffle $22^c$ terminates in a T 23 from which lateral branches extend to L's and nipples 24. The L's are arranged to point in a plane substantially parallel to the baffle $22^c$ so that oil forced in through connection 20 is discharged from the nipples 24 in two streams parallel to the third baffle and flowing over the third baffle. The two streams of oil discharged from the nipples 24 flow downwardly over the baffle $22^c$ being exposed to the vapors flowing over the baffle but without being distributed through the vapors as finely divided drops and particles. Entrainment is thus inhibited while direct heat exchange between the vapors and liquids is provided near the upper end of the tower. Heavier constituents of the vapors are condensed and any light constituents of the fresh oil suitable as components of the pressure distillate are vaporized from the exposed surfaces of the streams of fresh oil. Heat exchange is also effected between the oil and the vapors below the baffle by heat transfer through the baffle. From the lower edge of the baffle $22^c$ these two streams are discharged onto the next lower baffle $22^d$ over which they continue to flow downwardly through the tower. In falling from the baffle $22^c$ to the baffle $22^d$ the liquid constituents are somewhat distributed through the rising vapors, but due to the configuration of the baffles in the cylindrical tower, the liquid constituents tend to confine themselves to streams adjacent to the tower walls at the lower edge of the baffle, as shown at 25. The liquid oil thus continues to flow downwardly over the next lower baffle still more or less in the form of two streams. As the flow downwardly through the tower continues, however, the action of the rising vapors and the tendency of the downwardly flowing oil to film out over the baffles gradually causes the oil to flow from the lower edges of lower baffles as a more or less continuous sheet or film which is broken up by the rising vapors so that in the lower part of the tower the liquid oil is in effect sprayed through the rising vapors. This distribution of the liquid oil as a spray through the rising vapors may be delayed by providing lips 26 on the lower edges of one or more of the baffles succeeding the point of introduction of fresh oil arranged to promote the tendency of the liquid oil to flow downwardly to succeeding baffles as streams adjacent the tower walls.

The construction and operation described are particularly advantageous in heat insulated reflux towers as they assist in making substantially the entire tower available for effecting the desired heat transfer and refluxing operation while at the same time avoiding difficulties due to entrainment hitherto encountered in such towers where the fresh oil was introduced in the form of a spray near the upper end of the tower. This construction and operation are also useful where a part of the distillate, or a fraction of corresponding character, is directly introduced into the upper end of a reflux tower for promoting and controlling the refluxing operation therein, particularly where such a light fraction is introduced in admixture with heavier charging stock for the pressure still. In operations where the reflux tower is externally cooled, the invention is also useful although here the advantages are less marked as the effect of the external cooling may of course be realized throughout the entire length of the tower although the invention affords improvement as to the effect of the fresh oil introduced in promoting and controlling the refluxing operation.

I claim:

1. An improved method of cracking hydrocarbon oils, which comprises distilling the oil under pressure in a pressure still and passing the vapors from the still upwardly through a reflux tower, maintaining free flow of the vapors through the reflux tower while preventing transfer of heat from said vapors to any external cooling medium, withdrawing the remaining vapors from the upper end of the reflux tower, and introducing fresh oil to be supplied to the pressure still into direct contact with the vapors rising through the tower at a point near the upper end of the tower, initially supplying the fresh oil so introduced as compact streams, preventing distribution of the introduced oil through the vapors in a finely divided state near the upper end of the tower by causing the fresh oil to flow downwardly between said baffles in compact streams and the vapors to flow upwardly through the tower externally of said streams, and returning reflux condensate and unvaporized fresh oil from the reflux tower to the pressure still.

2. An improved method of cracking hydrocarbon oils, which comprises distilling the oil under pressure in a pressure still and passing the vapors from the still upwardly through a reflux tower, maintaining free flow of the vapors through the reflux tower, withdrawing the remaining vapors from the upper end of the reflux tower, and introducing fresh oil to be supplied to the pressure still into direct contact with the vapors rising through the tower at a point near the upper end of the tower, initially supplying the fresh oil so introduced as compact streams, preventing distribution of the introduced oil through the vapors in a finely divided state near the upper end of the tower by causing the fresh oil to flow downwardly between said baffles in compact streams and the vapors to flow upwardly through the tower externally of said streams, and returning reflux condensate and unvaporized fresh oil from the reflux tower to the pressure still.

3. In conjunction with an oil cracking pressure still, a reflux tower of baffle construction, the baffles being arranged to provide for free flow of vapors and ready discharge of liquid, connections for supplying vapors to the lower end of the reflux tower from the pressure still and for withdrawing vapors from the upper end of the reflux tower, means for returning oil from the lower end of the reflux tower to the pressure still, means for introducing fresh oil into direct contact with the vapors in the tower, said means including nipples arranged to discharge compact streams of fresh oil in a plane substantially parallel to and on a baffle near the upper end of the tower, and means for flowing the oil in the form of compact streams as introduced over baffles near the upper end of the tower, whereby vapors passing upwardly through the tower may pass externally of said streams.

In testimony whereof I affix my signature.

EUGENE C. HERTHEL.